United States Patent

[11] 3,620,704

[72] Inventor Foster Lee Gray
Dallas, Tex.
[21] Appl. No. 886,060
[22] Filed Dec. 18, 1969
[45] Patented Nov. 16, 1971
[73] Assignee Texas Instrument Incorporated
Dallas, Tex.

[54] METHOD AND APPARATUS FOR FORMING AND DRAWING FUSED METAL-OXIDE TUBES
18 Claims, 9 Drawing Figs.
[52] U.S. Cl. .......................................... 65/86,
65/141, 23/273 SP
[51] Int. Cl. ....................................... C03b 17/04
[50] Field of Search ........................... 65/86, 87,
88, 89, 66, 141, 375, DIG. 8; 23/273 SP, 301 SP

[56] References Cited
UNITED STATES PATENTS
2,188,121 1/1940 Smith .......................... 65/86 X
3,268,321 8/1966 Chapman ..................... 65/66 X
3,401,028 9/1968 Morrill, Jr. .................... 65/88 X Primary Examiner—Arthur D. Kellogg
Attorneys—Samuel M. Mims, Jr., James O. Dixon, Andrew M. Hassell, Harold Levine, Melvin Sharp, William E. Hiller and John E. Vandigriff ABSTRACT: A technique and apparatus for forming a fused metal-oxide structure, for example a fused silica tubing, by depositing a metal oxide on a deposition mandrel by vapor phase hydrolysis, heating the thus-deposited metal to a temperature sufficiently high to form a viscous glass melt, and drawing the structure from this glass melt.

INVENTOR:
FOSTER L. GRAY

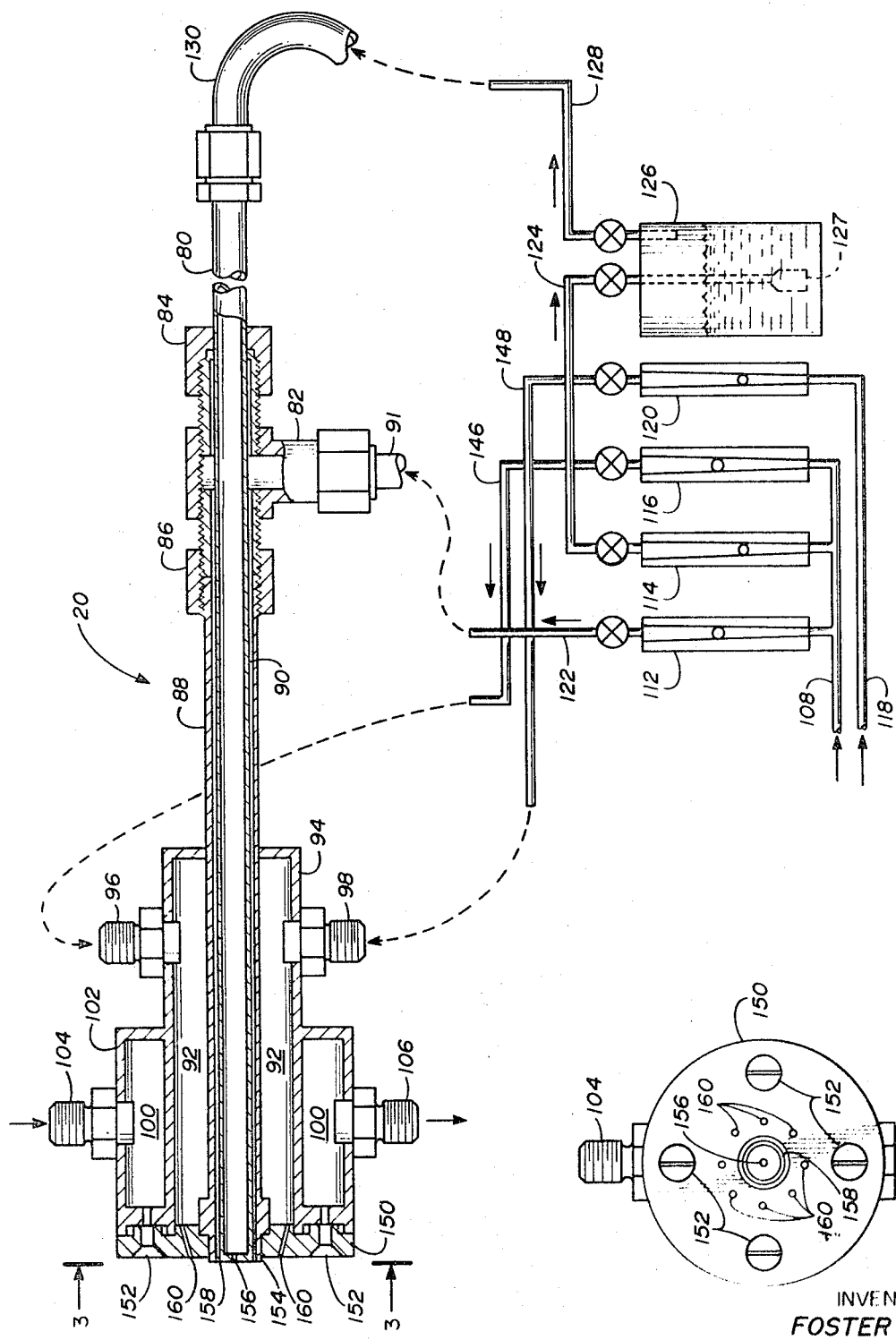

INVENTOR:
FOSTER L. GRAY

METHOD AND APPARATUS FOR FORMING AND DRAWING FUSED METAL-OXIDE TUBES

This invention relates to the formation of metal oxide structures and specifically to a method of drawing fused metal-oxide structures from a vapor phase hydrolysis deposition surface.

Various methods are known in the prior art for the manufacture of fused metal-oxide structures by drawing structure, for example, a sheet or tubing, from a viscous liquid melt of the metal oxide. Among the earliest example of a workable apparatus for producing a tubular silica structure is disclosed in U.S. Pat. No. 2,155,131. In that patent, quartz is fed into a melting chamber. A die having an annular shape is positioned at the bottom of the melt chamber and a glass tube is withdrawn through the die. An inert gas is fed into the center of the annular chamber to aid in prevention of the formation of crystalline quartz on the interior of the tube wall. The melting chamber is made of a material having a high melting point which is subject to little chemical attack by the molten quartz, for example, tantalum, tungsten or molybdenum. The disadvantages of method and apparatus reside in the high cost of the melt chamber material and in the fact that a preliminary operation of quartz production is necessary. U.S. Pat. No. 2,398,952 discloses an apparatus for the production of silica glass sheets. By this method powdered silica is fed to a melting chamber where a series of heating elements melts the powder. The glass melt is fed through an elongated aperture from which a glass sheet is drawn. An inherent disadvantage in this method of producing glass sheets is that gases are entrapped in the glass melt, appearing as bubbles in the final product. Additionally, a separate process for making the powdered silica is necessary. A third apparatus and method for producing glass tubing is described and illustrated in U.S. Pat. No. 2,979,864. In the latter patent, a glass melt is fed in the form of a stream onto a conically shaped mandrel. The chamber surrounding the mandrel is heated. A tube is then drawn from the small end of the material. In U.S. Pat. No. 3,261,676 another method for forming silica tubing is disclosed. In this method, granulated or powdered silica is fed to a heated chamber is melted, and is drawn through an annular die. This method again promotes the formation of bubbles in the final fused silica article and also requires that the powdered silica be produced in a separate operation.

It is therefore desirable to possess an apparatus and method for the formation of metal-oxide structures, for example fused silicon dioxide structures, which eliminates the disadvantages of the prior art processes and apparatus. A desirable method for the production of metal-oxide articles will simultaneously and continuously produce the desired metal oxide and form a fused structure therefrom. In addition, the method and apparatus will produce a structure which has a very high-purity metal-oxide content. The structure will be clear or milky as desired, but will contain little or no entrapped gases or other impurities.

To achieve the foregoing attributes, this invention therefore provides a method for continuously forming a structure from a fused oxide of a metal comprising depositing a metal oxide in a deposition zone upon a deposition surface, heating the metal oxide to a temperature which will fuse the oxide to form a plastic, vitreous mass, drawing a continuous structure from the plastic, vitreous, mass cooling the mass to a temperature below which it becomes rigid. In a preferred embodiment of the invention a tubular silicon dioxide structure is drawn from a mandrel of circular cross section.

In addition, a machine for performing this method is also provided including an apparatus for continuously drawing a structure from a fused plastic mass of metal oxide comprising a support member, a mandrel rotatable associated with the support member, means for rotating the mandrel, means for depositing a fused, plastic metal oxide mass on a deposition surface of the mandrel by vapor phase hydrolysis of a metal halide, means for continuously drawing a fused metal-oxide structure from the plastic mass.

The foregoing method and apparatus of this invention will be more readily understood by reference to the attached drawings in which:

FIG. 2 is a partially schematic cross-sectional view of a vapor phase hydrolysis torch for use with the apparatus of FIG. 1;

FIG. 3 is a front view of the torch of FIG. 2;

Figure 6:
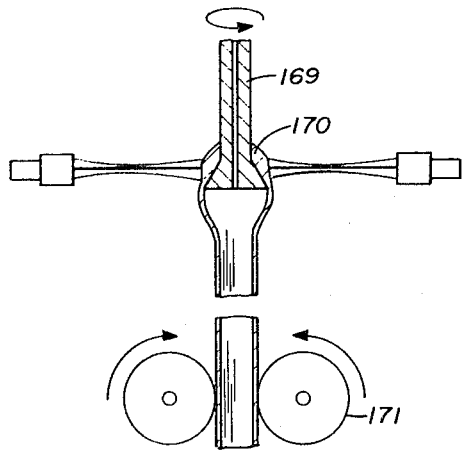
FIG. 6 is a representation of another embodiment of the invention for drawing a tubular structure from a mandrel.
Figure 7:
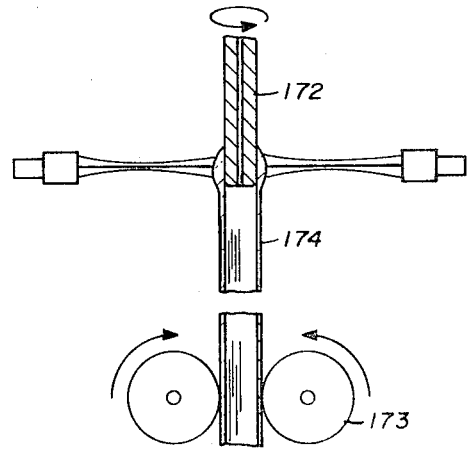
FIG. 7 is yet another embodiment of this invention for drawing a tubular structure from a cylindrical mandrel.

The invention will be described in relation to a preferred embodiment of producing fused silicon dioxide tubing. It is to be understood that various other hollow shapes can be made by the method of this invention. For example, as shown in FIGS. 6 and 7, a square tube can be produced by utilizing the method disclosed herein and subsequently drawing the tubing through a die of desired shape. In addition, a variety of other metal-oxide structures can be made by the method of this invention. . The metal oxides must, however, be ductile at elevated temperatures, i.e., it must be possible to form a melt around a mandrel and draw a hollow structure therefrom. Metal oxides which transcend directly from a solid to a nonviscous liquid are not within the scope of this invention. Various metal oxides, the within of which are selected from groups IIA, IIIA, IVA, IIIB, IVB and VB of the Periodic Table (as it appears on the flyleaf of Perry'Chemical Engineers' Handbook, edited by R. H. Perry, C. H. Chilton, and S. D. Kirkpatrick, 1963, McGraw-Hill Book Company, Inc., New York) and which meet the above requirement of ductility are useable within the scope of this invention.

Figure 1:
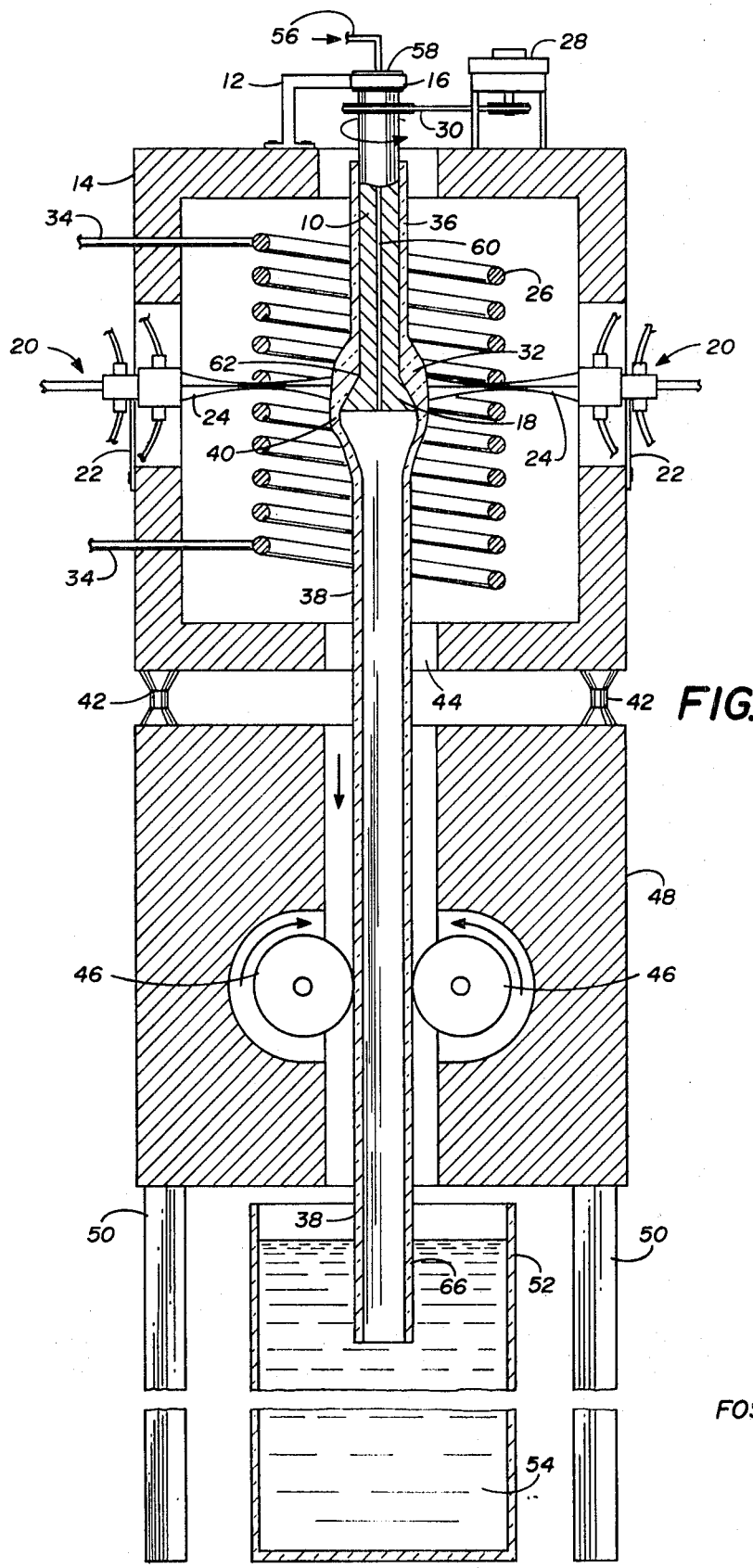
FIG. 1 is an apparatus for carrying out a preferred embodiment of the invention by drawing a tubular structure from a plastic, silicon dioxide melt.

Referring now to FIG. 1, an apparatus for producing fused silicon dioxide tubing is illustrated. A mandrel 10 is rotatably mounted to bracket 12 which is attached to hydrolysis enclosure 14. A suitable bushing 16 connects bracket 12 and mandrel 10. Enclosure 14 is made of a suitable refractory material and can be lined with graphite. Mandrel 10 is substantially of cylindrical configuration and has a bottom portion 18 of frustoconical. In this embodiment, the mandrel 10 and its bottom portion 18 are made of graphite. Other mandrel compositions can be used, as will be described hereinafter. Vapor phase hydrolysis torches, generally designated as 20, are mounted on bracket members 22 and positioned to direct their flame 24 toward the frustoconical portion 18 of the mandrel 10. A resistance heating element 26 surrounds the mandrel and extends above and below the frustoconical portion 18. The mandrel is rotated by a motor 28 through belt and pulley arrangement 30.

The vapor phase hydrolysis torches 20 are connected to suitable sources of combustible gas and to a suitable source of a metal halide. A metal halide is hydrolyzed in flame 24 to a metal oxide. The metal oxide is deposited on mandrel 10 as a glassy or vitreous plastic melt 32. A suitable hydrolysis torch is illustrated and described in conjunction with FIGS. 2 and 3 hereafter. The resistance heating coil 26 is connected through electrodes 34 to a suitable controlled electrical energy source. The temperature of the glass melt 32 must be kept at such a level to maintain the melt in a plastic state so that it can be drawn into a desired shape. For example, the temperature of a silicon dioxide melt is maintained in the range of from 1,800° to 2,200° and preferably near 2,000° C. The temperature of the area inside resistance coil 26 is maintained by that coil at around 1,500° C. The heat from the vapor phase hydrolysis torch flame 24 elevates the deposition zone and consequently the glass melt 32 to a a temperature within the required range of 1,800° to 2,200° C. If desired, the electrical resistance heating element 26 can be eliminated, since the torch flame 24 can be adjusted to maintain the glass melt within the required temperature range. However, more uniform heat control can be achieved when an auxiliary resistance heater such as that shown as 26 is utilized.

In the preferred embodiment of this invention, a silicon dioxide tube is produced. A tube bait 36 surround the upper portion of the mandrel 10. It rotates with the mandrel, but remains longitudinally stationary. As the mandrel 10 rotates, silicon dioxide being deposited by the vapor phase hydrolysis flame 24 is evenly distributed around the circumference of the mandrel 10 and the lower frustoconical die or end portion 18 of the mandrel. The lower portion of the mandrel is so shaped to prevent the glass melt 32 from sliding off the deposition zone. The shape of the lower portion of the mandrel depends, upon, among other things, the degree of adhesion of the various metal oxides to the mandrel and the mandrel composition itself. A tube 38 is drawn from the plastic, vitreous melt 32 contained on the lower portion 18 of the mandrel. The tube 38 will neck slightly in an area 40 immediately below the mandrel. It will assume a solid tubular configuration at a predetermined distance below the mandrel. This distance is dependent on the variety of factors including draw rate, temperature of the glass melt, the metal-oxide composition and the temperature of the inert gas inside the tube.

The enclosure 14 is mounted by members 42 on a pulling assembly 48. The tube 38 extends through an opening 44 in enclosure 14 and is in frictional contact with pulling rolls 46, which are mounted for rotation in the direction of the arrows on pulling assembly 48. The pulling assembly is mounted on suitable legs 50 extending down to a suitable floor or base. After tube 38 passes through pulling rolls 46, it is fed into a tank 52 containing a liquid 54, for example, water. The water or other suitable liquid serves a dual purpose. First, it quenches the tube 38 to a temperature low enough to ensure safe handling. Secondly, it provides a convenient seal for the hollow interior of tube 38. Such a seal is required because of the necessity of introducing nonoxidizing gas into the hollow interior of the tubular structure 38. To prevent oxidation of the mandrel surface, especially if the mandrel is composed of graphite, and to prevent impurity formation on the interior surface of the tube, a suitable inert or nonoxidizing gas, for example, nitrogen, is introduced into conduit 56 through a rotating seal member 58 and into channel 60 which runs through the center of mandrel 10. Channel 60 communicates with the interior of the tubular structure 38. The pressure of the gas inside the tubular structure 38 is maintained at slightly above atmospheric, for example, at a gauge pressure of 1 inch of water. The gas travels up interface 62 between the glass melt and the mandrel, thus forming a protective layer to prevent oxidation of the graphite and impurity formation of the tube. The gas is allowed to escape as necessary through the space between tube bait 36 and mandrel 10.

The lower portion of the tubing 66 can be conveniently scored by conventional techniques after it passes through pulling rolls 46. When the score reaches a level below the surface of the fluid 54, the lower portion of the tube can be broken away and removed from the liquid. Normally an apparatus such as that illustrated in FIG. 1 can have a receiving tank 52 which is over 40 feet long, thus allowing the continuous production of 40-foot lengths of tubing. It can readily be seen, through, that longer or shorter lengths can be produced as described. Referring now to FIGS. 2 and 3, a suitable vapor phase hydrolysis torch for practice of this invention is illustrated. It will be described with reference to hydrolysis of silicon tetrachloride to silicon dioxide by the following reaction.

$$SiCl_4 + 2 H_2 + O_2 = SiO_2 + 4 HCl$$

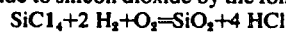

It is to be understood, however, that various liquid metal halides, preferably chlorides, can be utilized with this torch for hydrolysis to the corresponding metal oxide. This torch is similar to that disclosed in a copending application to Herbert J. Moltzan, Ser. No. 744,153 filed July 11, 1968, now pat. No. 3,565,345

Referring to FIGS. 2 and 3, tube or pipe 80, preferably constructed from stainless steel, extends through the length of the torch, generally designated as 20, to provide a passage for vaporized silicon tetrachloride entrained in a carrier gas. A T-connection designated generally by the numeral 82 is connected about the tube 80 and is sealed at one end to the tube 80 by collar member 84. A coupling member 86 fits over a stainless steel tube 88 to provide an annular sheath chamber 90 between the tube 80 and the tube 88. An inlet portion 91 of T-connection 82 is connected to a source of sheath gas in a manner to be later described, which here can be oxygen-containing gas. This sheath gas is passed into the annular sheath chamber 90.

A mixing chamber 92 is formed by chamber walls 94. An inlet fitting 96 is adapted to be connected to a source of a first combustible gas, while inlet 98 is adapted to be connected to a source of a second gas. The combustible gases are mixed within chamber 92 in order to limit any possible flashback to the torch housing. An outer annular chamber 100 is formed by annular walls 102 to define the cooling chamber about the torch. An inlet fitting 104 is connected to a suitable supply of cooled fluid, for example water, which is circulated through the chamber 100 and exhausted via outlet fitting 106.

Oxygen is supplied through a conduit 108 to the inlet of three flowmeters 112, 114 and 116. Hydrogen is supplied via a conduit 118 to a flow meter 120. Both the oxygen and hydrogen are dried prior to entering the flowmeters. Suitable valves are provided at the output of each of the flowmeters in order to allow accurate regulation of the flow rate of the gases to the torch. Oxygen is supplied from flowmeter 112 through a conduit 122 to the inlet portion 91 of the T-connection member 82. Oxygen is supplied from flowmeter 116 through a conduit 146 to the inlet 96 of mixing chamber 92. Hydrogen is supplied from flowmeter 120 through conduit 148 to the inlet 98 mixing chamber 92.

Oxygen from flowmeter 114 is supplied through a conduit 124 to a bubbler unit 126. The bubbler unit contains liquid silicon tetrachloride. The oxygen from conduit 124 passes through diffuser member 127, and passes up through the liquid silicon tetrachloride. As it does, liquid silicon tetrachloride is entrained or dissolved in the oxygen and is carried out through conduit 128 into the inlet 130 of tube 80. It is to be understood that a conventional vaporizer or diffuser-type unit can be used to replace the bubbler unit 126.

A nozzle assembly 150 is attached to the face of the torch 20 by screws 152. As shown in FIGS 2 and 3, four screws 152 pass through the nozzle assembly 150 and into portions of the walls defining chamber 100. Nozzle 150 comprises a unitary circular member having a center opening 154 for receiving the end of pipes 80 and 88. As best shown in FIG. 2, the end of the pipe 80 is closed with the exception of a center nozzle aperture 156 defined therein. Due to the difference in the diameters of pipe 80 and pipe 88, an annular opening 158 is defined concentrically about the nozzle aperture 156. A plurality of nozzle openings 160 are defined through the nozzle assembly 150. The diameter of these openings is generally the same or smaller than the diameter of the nozzle aperture 156.

In operation of the torch 20, silicon tetrachloride entrained in oxygen carrier gas is passed through the pipe 80 and out of the aperture 156 as a gaseous jet stream. A concentric sheath of oxygen is passed through annular opening 158. Eight streams of combustible mixture of hydrogen and oxygen are directed at an angle toward the axis of the jet stream for penetration of the gas sheath and interaction with the gaseous metal chloride. When the torch is ignited, combustion occurs at this region and the silicon tetrachloride is decomposed by vapor phase hydrolysis to form silicon dioxide. The flame is directed toward the glass melt 32 on the deposition mandrel 10 (FIG. 1) and becomes part of the plastic, vitreous silicon dioxide mass surrounding the frustoconical portion 18 of the mandrel.

Figure 4:
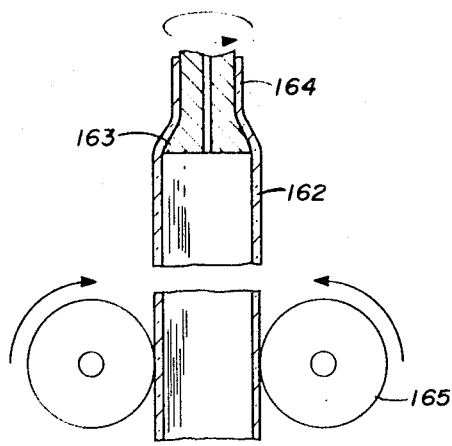
FIG. 4 is a representation of the manner in which a mandrel is baited prior to the tube-drawing process.
Figure 5:
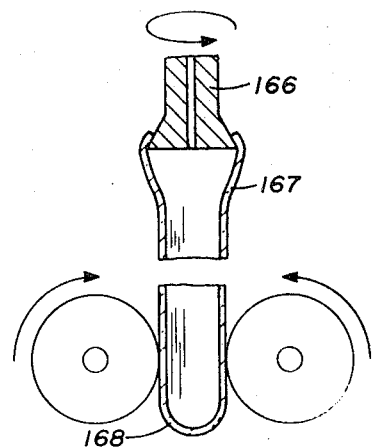
FIG. 5 is an illustration of another method of baiting the mandrel prior to the tube-drawing process.

FIGS. 4 and 5 illustrate the manner in which a mandrel is "baited," i.e., how the tube drawing process is initiated. FIG. 4 illustrates the procedure for baiting a graphite mandrel or other mandrel composition which will not be wetted by the fused metal-oxide mass. Initially, a tube 162 of the same metal-oxide material as will be subsequently drawn is formed over the frustoconical base portion of the mandrel 163 and is also formed over the upper portion of the tube bait 164 which will be adjacent the melt or deposition area. A tube 162 is extended down through the pulling rolls 165 and into a liquid tank as shown in FIG. 1. The deposition procedure is then started. When the metal oxide surrounding the base portion of the mandrel 163 is heated sufficiently to become plastic, rotation of the tube bait 164 is begun. As a glass melt (indicated as 32 in FIG. 1) is built up, pull rolls 165 begin to draw a newly formed tube from the mandrel base. Usually, the tubular metal oxide structure will begin to neck, i.e., reduce in diameter, immediately below the mandrel 163. Hence, it is necessary to reduce the distance between the pull rolls 165 to conform to the tube diameter. Conventional adjustment mechanisms are utilized to accomplish this and to maintain a constant tension or pull on the newly formed tube.

FIG. 5 illustrates another method for baiting a mandrel coated with, for example, silicon carbide. Such a coating will not react with silicon dioxide or other metal oxide being deposited to form impurities on the interior of the tubular structure. Since it is not necessary to protect the upper portion of the mandrel 166, a tube bait 167 is formed about the mandrel as illustrated. The bottom of the tube bait can be sealed as shown at 168 or can be extended down into a liquid tank as shown in FIG. 1. Conventional pull roll adjustment is utilized as required.

FIG. 6 illustrates the deposition procedure utilizing a mandrel 169 of graphite coated with a nonreactive substance, against for example, silicon carbide. The baiting procedure described in conjunction with FIG. 5 is utilized in this embodiment. The fused metal-oxide melt 170 is deposited around the frustoconical portion of the mandrel 169 and the tube is drawn therefrom by pull rolls 171.

FIG. 7 illustrates yet another embodiment utilizing a mandrel which will be wetted by the fused metal-oxide melt. This type of mandrel designates 172 composed of, for example, platinum is substantially cylindrical throughout its entire length. As set forth above, the use of a frustoconical end portion is dependent upon the temperature at which the glass melt is maintained, the degree of wetting of the mandrel surface by the metal oxide melt, the pressure of the nonoxidizing gas within the tubular structure, and the rate at which the tube is withdrawn from the mandrel by pull rolls 173. These factors also control the diameter and wall thickness of the tubular structure produced by the method of this invention. A metal-oxide tube 174 can be drawn from mandrel 172 with little or not necking below the bottom of the mandrel.

Figure 8:
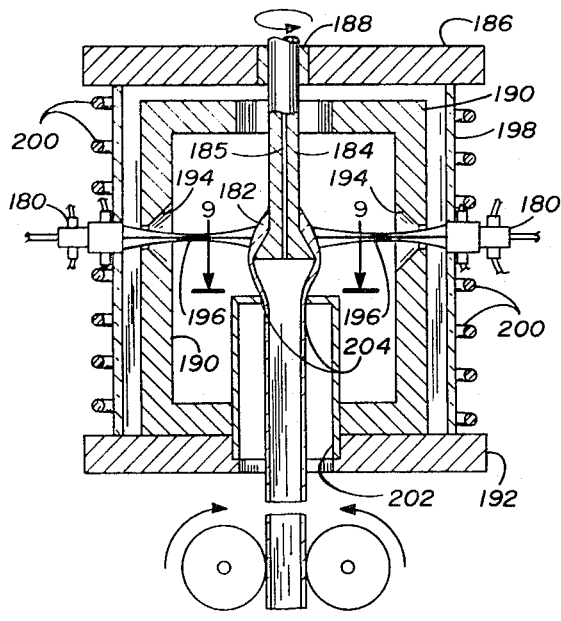
FIG. 8 illustrates a secondary step of drawing the tubular structure through a die before the structure is cooled below its plastic temperature.

Referring now to FIG. 8, a secondary operation on the newly formed tube is illustrated. It is performed immediately after the tubular structure is drawn from the mandrel. In this embodiment, vapor phase hydrolysis torches 180 deposit a plastic mass of fused metal oxide 182 on mandrel 184. The mandrel 184 is rotatably mounted through the top 186 of the deposition furnace. A seal 188 is interposed between the mandrel 184 and the top 186 to prevent leakage from the interior of the deposition furnace. A suitable heat shield 190 is mounted around the deposition zone and rests on the furnace floors 192. Apertures 194 are provided in the heat shield 190 to allow the torch flame 196 to reach the deposition area where the fused metal oxide 182 is deposited. The sides of the furnace comprise a quartz tube envelope 198 in which the torches 180 are sealingly mounted. Surrounding the quartz envelope is an inducting heating source illustrated as coils 200.

Figure 9:
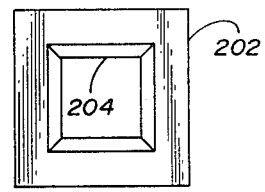
FIG. 9 is a top view of the die shown in FIG. 6 with the drawn tube omitted.

Coils 200 are connected to, for example, a radiofrequency energy source. In this embodiment, the mandrel itself is heated to a temperature sufficient when combined with the heat of the hydrolysis flame 196 to maintain the metal-oxide melt 182 in a plastic state. A die 202 mounted in mating grooves in the floor 192 of the furnace has an orifice 204 which is positioned immediately below the mandrel 184. The die can be heated by induction, can be unheated, or can be cooled as desired, depending upon the particular metal-oxide structure being formed and the properties desired therein. A typical die configuration is shown in FIG. 9 as having a rectangular opening or orifice 204.

In operation of the embodiment shown in FIG. 8, the fused metal-oxide mass 182 is first drawn into a somewhat tubular configuration. While the metal oxide is still in a plastic state, it is pulled through die orifice 204 where it conforms to the shape of the particular orifice being utilized, here to a rectangular shape. In this embodiment, the mandrel 184 would be baited as shown in FIG. 5, except that the bait would be positioned through the die and would be sufficiently small to ensure initial passage through the die. A nonoxidizing gas is also fed through channel 185 as described in conjunction with FIG. 1.

To ensure a better understanding of the invention, an exemplification follows wherein a graphite mandrel is vertically positioned in a deposition furnace lined with a suitable refractory material. The mandrel has a diameter through the main body portion of 3 inches. The mandrel has a bottom portion shaped substantially like a frustum of a cone, the depth of the frustum being 3½ inches, the major diameter being 3½ inches and the minor diameter being the same as that of the main body of the tube. The tube has a bore through its axis and is connected to a nitrogen supply outside the deposition furnace. The mandrel is rotated about its axis at about 20 r.p.m. Two vapor phase hydrolysis torches are positioned in a radial direction from the mandrel so that the nozzles of the torches are about 3¼ inches from the mandrel surface. The torches are positioned such that the metal oxide produced by vapor phase hydrolysis is deposited on the frustoconical section of the mandrel in a zone contiguous to its attachment point to the main body portion of the mandrel.

A fused silica tube bait is positioned about the mandrel and into a set of pulling rolls in a manner similar to that shown in FIG. 4. The bottom portion of the fused silica tube bail is sealed. Elemental hydrogen and oxygen are used as the the combustible gaseous mixture. Silicon tetrachloride in oxygen carrier gas is also supplied to the torch. The furnace is maintained at 1,550° C. by resistive heating elements positioned around the mandrel. The deposition zone is maintained at a temperature of abou2,000° 0C., augmented by the flames of the vapor phase hydrolysis torch. Elemental nitrogen is introduced through the mandrel bore into the interior of the tube bait. The nitrogen effectively prevents reaction between the graphite mandrel and the glass melt in the deposition zone. The pressure of the nitrogen is maintained slightly above atmospheric throughout the entire procedure. After the torches are ignited, vaporous silicon tetrachloride is fed into the flame of each torch at a flow rate of 40 grams of silicon tetrachloride per minute, depositing silicon dioxide, at a rate of about 7.1 grams per minute per torch. A toroidally shaped glass melt is formed around the intersection of the cylindrical and conical sections of the mandrel. When the thickness of the melt reaches about one-quarter to one-half inch, the pulling rolls are started and the fused silica tube is withdrawn from the mandrel at a rate consistent with the deposition rate.

A tube of uniform outside diameter and wall thickness of about 2.5 mm. is produced. The OD tolerances are plus or minus about 0.5 mm. The tube is transparent and compares favorably in quality with those produced by conventional methods.

Although the foregoing invention and example thereof have been described in relation to a specific embodiment, it is readily apparent to one of ordinary skill that many variations of the present invention can be made without departing from its spirit or intent. The invention is to limited only as defined in the appended claims.

What is claimed is:

1. An apparatus for continuously drawing a hollow tubelike structure from a fused plastic mass of metal oxide, comprising:
   a. a support member;
   b. A vertically suspended substantially cylindrical mandrel rotatably associated with the support member near the upper end of said mandrel;
   c. means for rotating said mandrel;
   d. means for depositing a fused, plastic metal-oxide mass on a deposition surface of the mandrel near the lower end thereof by vapor phase hydrolysis of a metal halide; and heating means for maintaining said deposited oxide in a plastic state.
   e. means for continuously drawing a hollow tubelike fused metal-oxide structure downward from the fused oxide mass surrounding the lower end of said mandrel.

2. The apparatus of claim 1 wherein said mandrel is composed of platinum.

3. The apparatus of claim 1 wherein said mandrel has a frustoconical die portion near the lower end thereof, the major circumference of the die portion being the lower end of the mandrel over which the structure is drawn.

4. The apparatus of claim 1 including means for circulating a nonoxidizing gas between the interior surface of said structure and the surface of the mandrel.

5. The apparatus of claim 3 wherein said mandrel, including the die portion thereof, is composed of graphite coated with silicon carbide.

6. The apparatus of claim 1 wherein the means for depositing comprises a plurality of vapor phase hydrolysis torches attached to the support member and positioned to deposit a metal oxide on the mandrel, said torches including means for feeding vaporous metal halide and combustible gas to each thereof.

7. The apparatus of claim 6 wherein the said torches each include a centrally located aperture for directing a gaseous stream of metal halide, circumvented by an aperture for directing a gaseous stream of oxygen and further circumvented by a plurality of apertures for selectively directing gaseous streams of a combustible gas.

8. The apparatus of claim 1 further including auxiliary heating means circumventing said mandrel.

9. An apparatus for continuously drawing a hollow tubelike structure from a fused plastic mass of metal oxide, comprising:
   a. a support member;
   b. a vertically suspended substantially cylindrical mandrel rotatably associated with the support member near the upper end of said mandrel, said mandrel having a frustoconical die portion near the lower end thereof with a major circumference at the lower end thereof;
   c. means for rotating said mandrel;
   d. a plurality of vapor phase hydrolysis torches attached to said support member and positioned to deposit a vitreous metal oxide on the mandrel, each of said torches directing a flaming gaseous stream radially inward toward said mandrel, said gaseous stream comprising oxygen, a combustible gas and a vaporous metal halide;
   e. heating means for maintaining said deposited oxide in a plastic state; and
   f. means for continuously drawing a hollow tubelike fused metal-oxide structure downward from the major circumference of said die portion.

10. A method for continuously forming a hollow tubelike structure from a fused metal oxide, comprising:
    a. depositing a plastic, vitreous mass of a metal oxide by vapor phase hydrolysis on a deposition zone of a selectively shaped vertically suspended mandrel;
    b. rotating said mandrel about its vertical axis;
    c. continuously drawing a hollow tubelike structure downward from the plastic oxide mass surrounding the lower end of said mandrel as the metal oxide is deposited; and
    d. cooling the drawn structure to a temperature below which it becomes rigid.

11. The method of claim 10 wherein said metal oxide is deposited from a flaming gaseous stream comprising oxygen, a combustible gas and a gaseous metallic compound.

12. The method of claim 11 wherein said metallic compound is silicon tetrachloride.

13. The method of claim 10 wherein said mandrel has a frustoconical-shaped lower end portion with a major circumference at the lower end thereof.

14. The method of claim 10 further comprising heating said deposition zone with an auxiliary heat source circumventing said deposition zone.

15. The method of claim 10, wherein the deposition zone is heated to a temperature within the range of from 1,800° to 2,200° C.

16. The method of claim 14 wherein said auxiliary heat source is a radiofrequency induction source and said mandrel serves as a susceptor.

17. The method of claim 10 wherein the drawn end of the tube like structure is sealed and the method further includes introducing a nonoxidizing gas into the interior of the drawn structure.

18. The method of claim 10 further including the step of drawing the structure through a selectively shaped die while the structure is still in a plastic state.

* * * * *